United States Patent Office 3,713,928
Patented Jan. 30, 1973

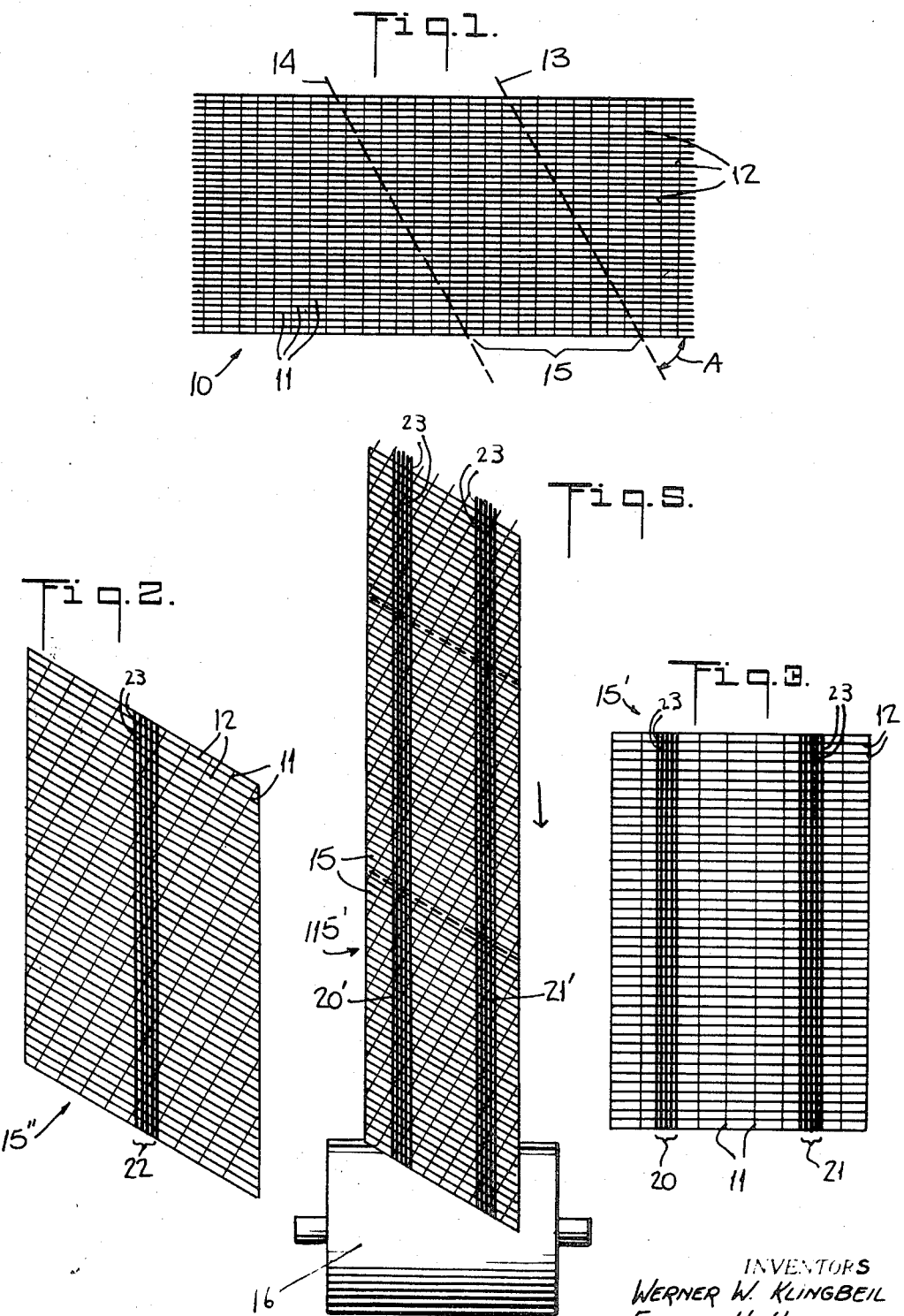

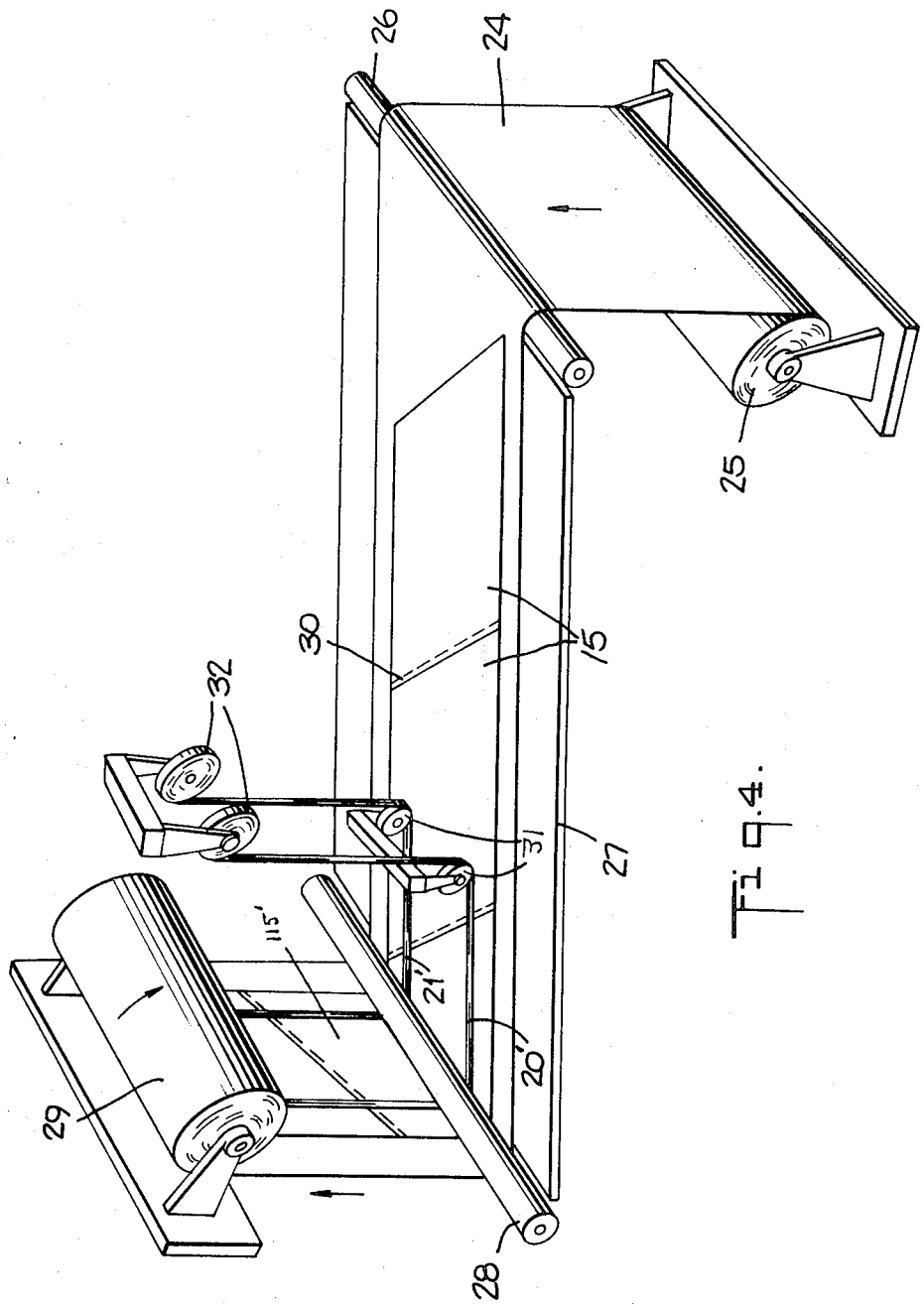

3,713,928
TIRE CARCASS FABRICATING METHOD
Werner W. Klingbeil, Paterson, N.J., and Eugene H. Hartman, Venice, Fla., assignors to Uniroyal, Inc., New York, N.Y.
Original application Mar. 18, 1968, Ser. No. 713,935, now Patent No. 3,616,132. Divided and this application Feb. 19, 1971, Ser. No. 116,889
Int. Cl. B29h 17/28
U.S. Cl. 156—123                                                    1 Claim

ABSTRACT OF THE DISCLOSURE

Distortion of tire cord fabric in tire building operations is avoided by adhering to the pieces of cord fabric external strands arranged parallel to the lateral edges of the piece to reduce the stretch of the cord fabric, the strands taking longitudinal stresses as the pieces are pulled in the tire building operation.

---

This application is a division of my copending U.S. application Ser. No. 713,935, filed Mar. 18, 1968, now Pat. 3,616,132.

This invention relates to the manufacture of pneumatic tires constructed of carcass fabric having warp cords and weft yarns and to improved carcass fabric strips for use in such manufacture, and to the method of using the same in building a tire.

Carcass fabrics previously used for building tires have generally comprised rubber coated fabrics having longitudinally extending warp cords and transversely extending weft yarns disposed at right angles to the warp cords. In the manufacture of tires using bias cut fabric, a continuous length of the fabric is bias cut at spaced locations at an angle of approximately 60° to the warp cords to produce generally parallelogram shaped pieces. In the manufacture of radial ply tires, the fabric is cut at right angles to the warps into rectangular shaped pieces.

The individual pieces normally are spliced together end-to-end into a continuous strip, and the strip is wound on a festoon with the lateral edges of the pieces perpendicular to the axis of the festoon. In such a continuous strip formed from pieces of bias cut fabric both the warp cords and weft yarns, still at an angle of 90° with respect to each other, are arranged at angles, different from 90°, with respect to the lateral edges of the pieces, and in a strip formed from radial ply pieces the warp cords are arranged at an angle of 90° with respect to the lateral edges of the pieces.

When the strips are used in building a tire, they are pulled, or otherwise unwound from the festoon, in a direction parallel to the lateral edges of the fabric. Inasmuch as in the bias cut fabric the warp cords extend at oblique angles to the lateral edges of the piece, and in the radial ply fabric only the extremely weak weft yarns extend parallel to the lateral edges, there are no strong cords extending in the direction of pull to provide a strong resisting force to this pull on the cut pieces. Consequently, the longitudinal distortion, or stretching, of the piece, and in the case of bias cut fabrics the warp cord angle deformation, are high in this old method, which results in a cured tire that is non-uniform.

It is an object of this invention to provide a method of manufacturing a more uniform tire.

A further object is to provide an improved carcass fabric for application to a tire building form.

A still further object is to provide a carcass fabric which better resists distortion and angle deformation when pulled longitudinally from festoons, turrets, and the like, in tire building operations.

Further objects and advantages of this invention will become apparent as this description proceeds.

The objects of this invention are accomplished by providing a carcass fabric piece having generally parallel lateral edges with interwoven warp cords and weft yarns normal to each other, said piece having adhered to a surface thereof, but without interlacing with the warp and weft, a band or bands of high strength low-stretch strands, cords or yarns in which the low-stretch strands, cords or yarns in the bands extend generally parallel to the lateral edges of the piece.

The tire is produced by pulling this carcass fabric piece having such band or bands from festoons, turrets or the like in a direction substantially parallel to the lateral edges of the piece, and, therefore, substantially parallel to these low-stretch strands, cords or yarns (which serve to prevent objectionable stretch of the piece), and leading the piece onto a tire building drum; by otherwise building the tire on such drum and subsequently expanding the same circumferentially, and otherwise molding and vulcanizing the tire in the usual way. During the circumferential expansion said low-stretch strands, cords or yarns may be ruptured, depending upon their location in the tire.

For a better understanding of the nature of the present invention, reference should be had to the following detailed description of specific embodiments thereof taken in conjunction with the accompanying drawings wherein:

FIG. 1 is a top plan view of a tire cord fabric showing the warp cords and weft yarns;

FIG. 2 is a top plan view of a piece of tire cord fabric bias cut from the fabric of FIG. 1 along the bias cut lines indicated in FIG. 1 and having applied thereto a longitudinally extending band of low-stretch strands extending generally parallel to the lateral edges of the piece;

FIG. 3 is a view generally similar to FIG. 2 but of a piece of radial ply fabric having two such longitudinally extending bands arranged symmetrically with respect to the longitudinally extending center line of the piece;

FIG. 4 is a schematic view illustrating one method of applying the low-stretch strands, cords or yarns in the manufacture of continuous strips of fabric;

FIG. 5 is a top plan view of a tire building drum and a section of a carcass fabric piece being applied thereto by pulling the fabric piece in the direction indicated by the arrow in the figure;

Figure 6:
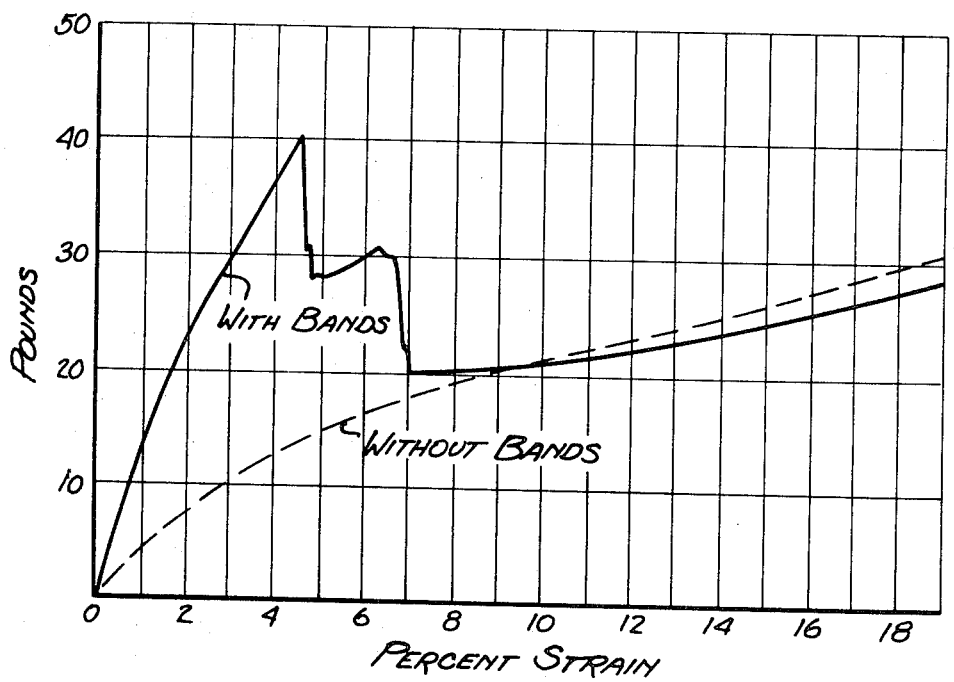
FIG. 6 is a chart of load-strain curves for bias cut fabrics with and without the strands used in this invention.

According to this invention a fabric shown generally at 10 in FIG. 1 is provided in the usual tire cord fabric construction which comprises strain-resisting warp cords 11 extending in a longitudinal direction and weaker weft yarns 12 extending transversely of the fabric at substantially right angles to the warp 11 and interwoven therewith in a plain weave.

To prepare bias cut carcass fabric pieces, the fabric of FIG. 1, rubber coated, is bias cut along lines such as 13 and 14 to provide a piece of fabric 15 having the width, measured normal to the lines 13, 14, desired in the carcass ply. The cuts along lines 13, 14 form the lateral edges of the fabric piece which is to form the carcass ply, and both the warp cords 11 and weft yarns 12 extend obliquely with respect to the edges formed by cuts 13, 14. Angle A (FIG. 1) represents the bias angle at which the fabric 10 is cut. This angle is usually 60°; however, it is not critical since different bias angles may be used if desired.

In accordance with this invention low-stretch strands arranged in a narrow band or bands are applied externally to the carcass fabric piece and not interlaced with the cords and yarns of the fabric piece, and the strands in the bands extend generally parallel to the lateral edges of the piece. A radial ply rubber coated carcass fabric piece 15' having the now prefererd two bands 20, 21 each containing a plurality of such low-stretch strands 23 is shown in FIG. 3, and a bias cut rubber coated carcass fabric piece 15'' having a single such band 22 containing a plurality of such strands is shown in FIG. 2. In the embodiment shown in FIG. 3 the two bands 20, 21 are arranged with one band on each side of the longitudinal center line of the piece 15' and spaced the same distance from the longitudinal center line of the piece. In the embodiment shown in FIG. 2 the single band 22 is disposed along the longitudinal center line of the piece 15''.

In manufacturing a tire, a plurality of fabric pieces 15' or 15'' are spliced together end to end to form a continuous strip such as that shown at 115' in FIG. 4. The splicing together of bias cut fabric pieces to form a continuous strip, and the application to the continuous strip of the low-stretch strands of this invention, are illustrated in FIG. 4 of the drawing. A canvas liner 24 is unwound from a roll supply 25 and advanced over a roller 26 from whence it is directed horizontally over a supporting table illustrated schematically at 27. After passing over the table 27, the liner 24 passes under a further roller 28 and is directed upwardly to a take-up spool 29 to be wound thereon with the strip 115' of carcass fabric. As the liner 24 passes over table 27 fabric pieces 15 are laid thereon with each succeeding fabric piece joined to the next preceding fabric piece by a lap seam such as that illustrated at 30. The fabric pieces next pass under small cylinder rollers 31 at each of which five low stretch strands from reels 32 are pressed against fabric piece 15 and adhered thereto. Thereafter the fabric pieces, seamed together and carrying the low-stretch strands thereon, are carried by the liner 24 under the roller 28 and are wound up on the take-up spool 29 with the liner.

It will be seen from the foregoing that the bands 20', 21' are formed by applying continuous, unbroken, lengths of strands 23 over not only the several pieces 15 but also over the seams 30 between the several pieces which make up the continuous strip 115'.

Each of the bands 20, 21, 22, 20' and 21' contains a plurality of high strength low-stretch strands 23 extending generally parallel to the later edges of the fabric piece 15, 15' or 15'', as the case may be, and adhered only to one side of this fabric piece but not interlaced with the warp or weft of the fabric piece. Inasmuch as the strands 23 in the bands 22, 20' and 21' are substantially parallel to the lateral edges of the bias cut fabric pieces 15'' and 15, the strands 23 will be angularly disposed with respect to both the warp and the weft making up these pieces 15'' and 15.

The bands 20, 21, 22, 20' and 21' may have various constructions within the limits of this invention. In the simplest, they consist of a number of low-stretch, high strength strands 23 parallely arranged and closely spaced, for example five such strands 23 arranged side-by-side over a total band width of ½'' and adhered to the side of the fabric. In another example a gauze is used for the bands 20, 21, 22, 20' and 21' with the strands 23 consisting of the gauze warp.

Various types of strands 23 may be used. Together, the strands used on a given piece of fabric must add sufficient strength so the fabric withstands the longitudinal handling loads applied to it prior to and during tire construction without objectionable expansion under these loads. They should not stretch appreciably. But if required by their location in the carcass such as in the FIG. 2 embodiment, the strands 23 must be sufficiently weak to rupture in the tire shaping process without inducing significant alterations in the tire cord distribution. High tenacity saponified acetate filament yarns have been found especially satisfactory for the strands 23.

The adhesive used to bond the strands 23 to the carcass fabric should permit the development of a bond strength sufficient to prevent peeling of the strands from the fabric upon application of longitudinal load to the finished fabric-strand composite in the tire building operation. The following adhesive has been found satisfactory:

|  | Parts by weight |
| --- | --- |
| Natural rubber | 60 |
| SBR | 40 |
| HAF carbon black | 55 |
| Phenolic tackifier resin | 10 |
| Zinc oxide | 5 |
| Stearic acid | 1 |
| N-cyclohexyl-2-benzothiazole sulfenamide | 1 |
| Sulfur | 2 |
| Gasoline | 1750 |

The following specific examples will further illustrate this invention:

EXAMPLE I

This embodiment generally resembles that shown in FIG. 2 of the drawing. A single band 22 having a total width of one-half inch was used. This band consisted of five continuous filament substantially untwisted multi-filament strands 23 equally spaced at .125'' from each other with the band centered on the longitudinal center line of the piece 15''. Each of the five strands 23 in the band 22 extended generally parallel to the lateral edges of the piece 15'', and consisted of a 300 denier high-tenacity saponified acetate filament yarn sold under the trademark "Fortisan." The measured ultimate (breaking) strength of each strand 23 was 2.5 pounds. Each of the strands 23 was adhered to the rubber coated cord fabric 15'' using a tire tread-carcass cement having been pre-dipped in such cement. The strands 23 were applied as a group to the piece 15'' by rolling the same thereon.

EXAMPLE II

This example resembles the embodiment illustrated in FIG. 3 of the drawing but applied to a bias-cut fabric. Several pieces 15 of a tire cord fabric were bias cut to the desired width. Pieces 15 were laid individually on a polyethylene liner, and two bands 20', 21', each .5'' wide running parallel to the lateral edges of the piece 15 and each centered 8.5'' from, and on opposite sides of, the longitudinal center line of the piece were provided. Each band 20', 21' consisted of five reinforcing strands 23 at a spacing of .125'' from each other which were cemented to the piece 15 by a tread-carcass cement. Each of the strands 23 consisted of 300 denier Fortisan as described above. The bands 20', 21' were applied to pieces 15 by a mechanical roller. As the bands 20', 21' were applied to each strip 15, that strip was rolled into the polyethylene liner and a second strip 15 of fabric was spliced to the unreinforced end of the preceding strip 15 so that the bands 20', 21' could be contitnued across the splice without interrupting the continuous filaments in the strands 23. Continuing in this way, a continuous strip 115' of bias cut fabric containing such continuous bands 20', 21' was prepared for each of the four ply widths required for the building of a four-ply tire. These strips 115' were rolled into the servicer for a tire builder and a tire was built and vulcanized in a conventional mannner. During the expansion of the tire in the mold, the strands 23 in the strips 20', 21' were ruptured at spaced points about the periphery of the tire.

EXAMPLE IIII

This example is generally similar to Example II excepting that continuous rolls of bands 20', 21' were prepared in advance by reeling the five threads of the band into a cellophane liner. Two bands 20', 21' were applied to the piece 15 by unrolling the bands from the cellophane liner and applying the same in bands 20', 21' each centered 9" from, and on opposite sides of, the longitudinal center line of the piece 15.

Continuous strip 115' is shown adjacent a tire building drum 16 in FIG. 5 and in the position in which a section 15 appears immediately before it is wound onto the rotating drum. The section 15 is pulled onto the drum 16 by a force exerted in the direction of the arrow (downwardly) in this figure. The stress applied to the section 15 in this operation tends to longitudinally distort the section and, in the case of bias-cut fabric, to change the angle of the warp cords therein, thus resulting in a non-uniform section. Further, several different operations having a similar tendency to distort the section 15 may have been performed on individual sections 15 prior to their arrival adjacent drum 16. For example, the length 115' may have been wound on a festoon prior to advancing to the building drum, and during such operation the sections 15 therein may have been subjected to stresses which further tend to longitudinally distort the sections. The strands 23 serve admirably to resist such distortion.

Figure 7:
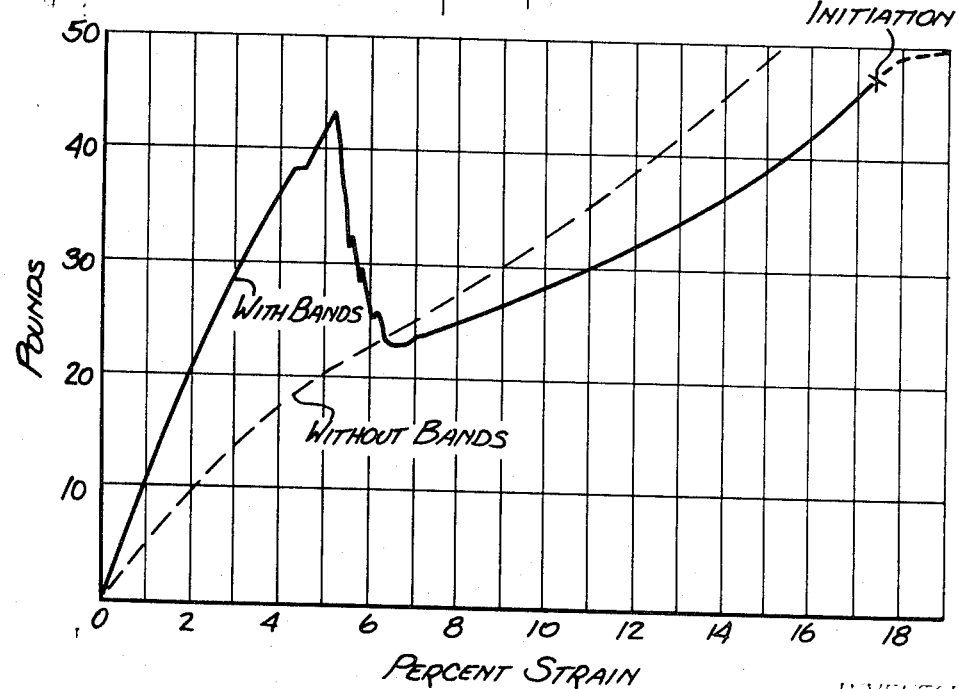
FIG. 7 is a chart of load-strain curves for radial ply fabrics with and without the strands used in this invention.

FIGS. 6 and 7 illustrate the improvement in carcass fabric stability obtained using this invention. To simulate the action of the appropriate full 24" width of carcass fabric as used in tire building, a 12" wide fabric was formed into a loop with the normal longitudinal direction of the fabric extending circumferentially of the loop, and this specimen was mounted in an Instron tensile tester by inserting rods in the ends of the loop and clamping the loop assembly into the jaws of the tester which were separated at a speed of 20"/minute. FIG. 6 shows the load-strain curves for bias cut fabric and FIG. 7 shows the load-strain curves for radial ply fabric with and without the low stretch strands used in this invention.

As will be seen from the figures, over the range of loads from a minimal load of 2 to 3 pounds up to about 35 pounds the fabrics of this invention provide an improved stiffness over ordinary carcass fabrics in the order of 2 to 3-fold, or above.

The crimp of the wefts in normal tire cord fabric is approximately 14%. An operable tire might be manufactured when the tire cord fabric elongated as much, perhaps, as 10%, but a tire made with such elongation would not be commercially acceptable. For a good commercial tire much less elongation could be tolerated; the carcass fabric should not elongate beyond approximately 3% in the manufacturing process prior to shaping and molding, and desirably the elongation should be held under this 3% figure. As will be seen from FIGS. 6 and 7, tires made according to carcass fabrics of the type contemplated by this invention will withstand loads of at least 20 pounds without elongating more than 3%.

The tenacity of the 300 denier Fortisan yarns employed in the specific example is 2½ pounds, and when five yarns are employed the total tenacity of the yarns in the band is 12½ pounds. Preferably the strands 23 should have a combined tenacity of 10 pounds without stretching more than 3%.

We claim:

1. In the manufacture of tires, the method which comprises providing a plurality of rubber coated bias cut pieces of tire cord fabric, each such piece having lateral edges and interlaced warp cords and weft disposed substantially at right angles to each other, said wrap cords and wefts both being disposed obliquely with respect to said lateral edges, splicing a plurality of said pieces together end to end in a continuous length, adhering a plurality of reinforcing strands ruptable at tire-shaping stresses to one side of said spliced pieces with said reinforcing strands arranged parallel to said lateral edges and being continuous across said splices, pulling said spliced pieces longitudinally onto a building drum, building a tire carcass on said drum including reinforcing plies from said continuous lengths, and shaping said tire carcass and rupturing at least some of said strands in said shaping process.

References Cited
UNITED STATES PATENTS

| | | | |
|---|---|---|---|
| 1,961,725 | 6/1934 | Abbott | 156—405 X |
| 1,933,692 | 11/1933 | Abbott | 156—123 X |

STEPHEN C. BENTLEY, Primary Examiner